C. A. SPECHT.
BUSHING FOR MINE CAR WHEELS.
APPLICATION FILED JULY 13, 1915.
1,154,345.
Patented Sept. 21, 1915.
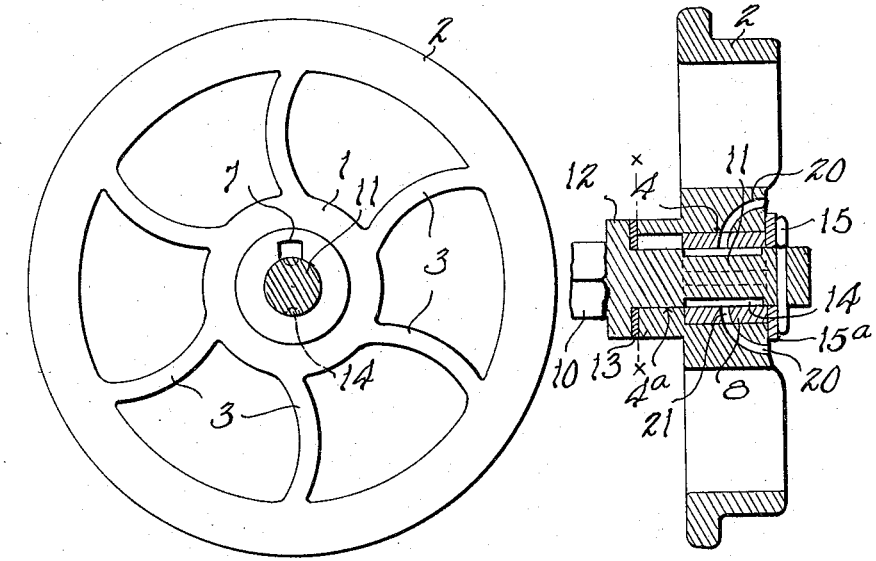
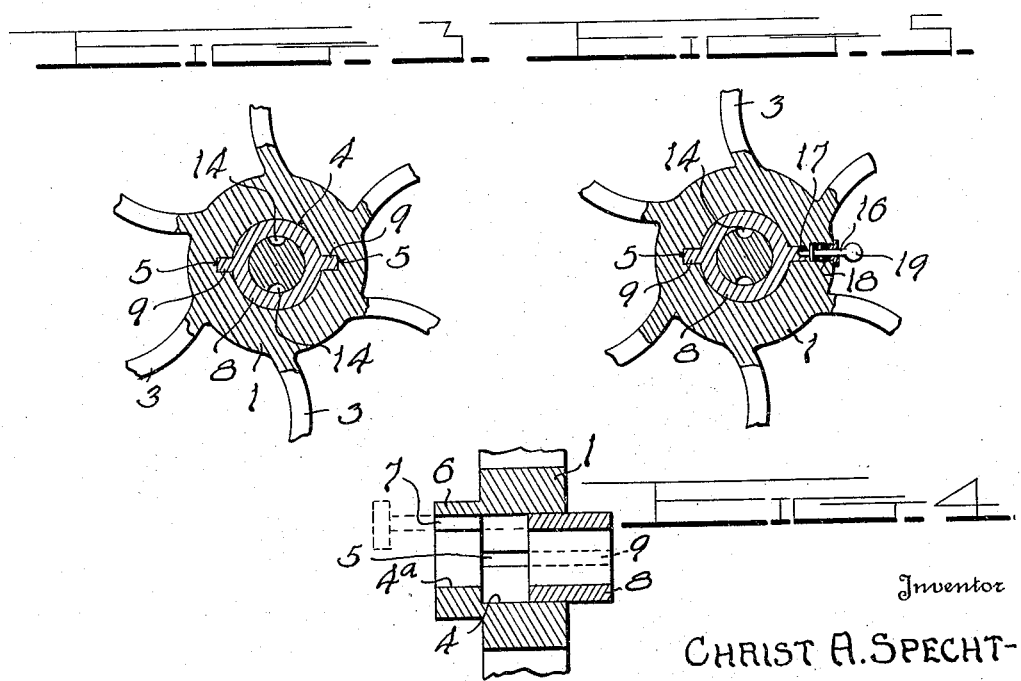
Inventor
CHRIST A. SPECHT
By N. S. Ikee
Attorney

UNITED STATES PATENT OFFICE.

CHRIST A. SPECHT, OF PUNXSUTAWNEY, PENNSYLVANIA, ASSIGNOR OF ONE-HALF TO GEORGE L. SCHICKER, OF PUNXSUTAWNEY, PENNSYLVANIA.

BUSHING FOR MINE-CAR WHEELS.

1,154,345.   Specification of Letters Patent.   Patented Sept. 21, 1915.

Application filed July 13, 1915. Serial No. 39,709.

*To all whom it may concern:*

Be it known that I, CHRIST A. SPECHT, a citizen of the United States, residing at Punxsutawney, in the county of Jefferson and State of Pennsylvania, have invented certain new and useful Improvements in Bushings for Mine-Car Wheels, of which the following is a specification.

The present invention relates to a removable bushing for the wheels of mine cars and the like, the object of the invention being to provide a novel manner of constructing and mounting the bushing so that it can be readily replaced when worn, thereby making the old wheel substantially as good as a new wheel and eliminating the expense of providing an entirely new wheel.

Further objects of the invention are to provide a device of this character which is comparatively simple and inexpensive in its construction, which can be readily replaced when worn, which is held securely in position when in use, and which will greatly prolong the lives of the wheels in connection with which it is used.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a front elevation of a mine car wheel constructed in accordance with the invention, looking at the wheel from the inner side, and the axle appearing in section. Fig. 2 is a transverse vertical sectional view through the same. Fig. 3 is a fragmentary view of the central portion of the wheel, the hub and bushing, together with the axle, appearing in section. Fig. 4 is a fragmentary sectional view through the hub, showing the manner of driving the bushing out of position. Fig. 5 is a view similar to Fig. 3, showing a slight modification.

Corresponding and like parts are referred to in the following description and indicated in all the views of the drawings by the same reference characters.

Specifically describing the present embodiment of the invention, the numeral 1 designates the hub of a mine car wheel, 2 the rim or tread thereof, and 3 the spokes connecting the hub and tread. The body portion of the hub 1 is provided with a bore 4 extending axially into the same from the outer side of the wheel, said bore being provided upon diametrically opposite sides thereof with longitudinally extending grooves 5. At the inner side of the wheel the hub 1 is formed with an extension 6 having a bore 4ª therein which is smaller than the bore 4, but concentric and in alinement therewith. A notch 7 is formed in one side of the reduced bore 4ª.

A tubular bushing 8 is inserted in the bore 4 of the hub from the outer side of the wheel, said bushing being provided upon the exterior thereof with longitudinally disposed ribs 9 which fit in the grooves 5 and coöperate therewith to prevent any relative rotation of the wheel and bushing. The end of the bushing 8 abuts against the portion 6 of the hub 1 and the opening of the bushing is of the same size as the reduced bore 4ª of the hub extension 6, and in registry therewith.

The numeral 10 designates an axle which is of the conventional construction, and is provided at the end thereof with the spindle 11 which extends through the bushing 8 and portion 6 of the hub, the usual enlarged collar 12 being provided at the junction of the spindle and axle. A suitable washer member 13 may be fitted upon the spindle 11 and interposed between the inner face of the hub 1 and the shoulder provided by the enlarged collar 12. The usual lubricant receiving channels 14 may be formed in the spindle 11 and the end of the spindle projecting beyond the hub may be provided with a transverse opening to receive a retaining pin 15. A washer member 15ª may be interposed between the hub of the wheel and the retaining pin 15. Suitable oil ducts 20 are formed in the hub and lead from the bore 4 to the sides thereof, and registering openings 21 are formed in the bushing 8, so that oil or lubricant can be readily inserted into the lubricant receiving channels 14 of the spindle 11.

When the bushing 8 becomes worn, the wheel can be readily slipped from the axle, the worn bushing removed, and a new bushing inserted in place, thereby rendering the old wheel substantially as good as a new wheel and eliminating the necessity of scrapping the old wheels and placing an entirely new wheel in position. Should the bushing stick in position and difficulty be encountered in removing the same, it can be driven out of the hub by means of a tool inserted in the notch 7 and engaging the end of the bushing.

A slight modification is shown by Fig. 5, in which the hub is provided with a radially disposed spring actuated plunger 16 adapted to interlock with a recess 17 in one of the wings 9 of the bushing to lock the bushing against accidental displacement. Any suitable form of spring 18 may be provided for normally holding the plunger 16 in operative position, while the outer end of the plunger may terminate in a knob or finger piece 19 adapted to be grasped by the fingers of the hand, or engaged by a suitable tool, for retracting the plunger into inoperative position when it is desired to remove the bushing from position in the hub of the wheel.

Having thus described the invention, what I claim as new and desire to secure by Letters Patent, is:—

1. The combination of a car wheel formed with a hub having an enlarged axial opening extending into the same from one end thereof, the opening being reduced at the opposite end of the hub, the enlarged opening being provided at the sides thereof with longitudinal grooves while the reduced opening is provided at one side thereof with a notch, and a tubular bushing fitted removably in the enlarged opening of the hub and having a bore of the same size as the reduced opening of the hub, said bushing being provided upon the exterior thereof with longitudinal wings adapted to engage the before mentioned grooves, and being adapted to be driven out of position by a tool inserted in the before mentioned notch.

2. The combination of a car wheel formed with a hub having an enlarged axial opening therein, the sides of the opening being provided with longitudinal grooves, a tubular bushing fitted removably within the enlarged opening of the hub and formed with wings engaging the before mentioned grooves, said wings being recessed, and a radially disposed locking plunger mounted within the hub for engagement with the recess of one of the wings to lock the bushing in position within the hub.

3. The combination of a car wheel formed with a hub having an enlarged axial opening entering the same from one end thereof and a reduced axial opening entering the same from the opposite end thereof, the enlarged opening being provided in the sides thereof with longitudinal grooves while the reduced opening is provided at one side thereof with a notch, a tubular bushing fitted removably in the enlarged opening and having a bore of the same size as the reduced opening and in registry therewith, said bushing being provided with wings adapted to enter the longitudinal grooves of the enlarged opening and being adapted to be driven out of position by a tool inserted in the notch of the reduced opening, and a radially disposed locking plunger mounted within the hub for engagement with one of the wings of the bushing to retain the bushing in position.

In testimony whereof I affix my signature in the presence of two witnesses.

CHRIST A. SPECHT.

Witnesses:
  JOHN CUMMINGS,
  PAT CUMMINGS.